United States Patent
Si et al.

(10) Patent No.: US 10,904,919 B2
(45) Date of Patent: Jan. 26, 2021

(54) INFORMATION FEEDBACK METHOD, BASE STATION, TERMINAL AND STORAGE MEDIUM

(71) Applicant: CHINA ACADEMY OF TELECOMMUNICATIONS TECHNOLOGY, Beijing (CN)

(72) Inventors: Qianqian Si, Beijing (CN); Xueming Pan, Beijing (CN); Jiaqing Wang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 50 days.

(21) Appl. No.: 16/090,128

(22) PCT Filed: Mar. 8, 2017

(86) PCT No.: PCT/CN2017/075922
§ 371 (c)(1),
(2) Date: Sep. 28, 2018

(87) PCT Pub. No.: WO2017/166984
PCT Pub. Date: Oct. 5, 2017

(65) Prior Publication Data
US 2019/0116616 A1 Apr. 18, 2019

(30) Foreign Application Priority Data
Apr. 1, 2016 (CN) .......................... 2016 1 0203320

(51) Int. Cl.
*H04W 74/08* (2009.01)
*H04W 74/00* (2009.01)
(Continued)

(52) U.S. Cl.
CPC ....... *H04W 74/0808* (2013.01); *H04L 5/0055* (2013.01); *H04W 72/0446* (2013.01); *H04W 72/1289* (2013.01); *H04W 74/006* (2013.01)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS 8,509,160 B2 8/2013 Kotecha
10,701,722 B2 * 6/2020 Kim .................. H04W 72/1278
(Continued)

FOREIGN PATENT DOCUMENTS

| CN | 101785209 A | 7/2010 |
|---|---|---|
| EP | 3413653 A1 | 12/2018 |
| WO | 2016006450 A1 | 1/2016 |

OTHER PUBLICATIONS

3GPP TSG RAN WG1 Meeting #84, R1-160595, St Julian's, Malta, Feb. 15-19, 2016, Source: OPPO, Title: HARQ-ACK transmission on eLAA carrier, Agenda Item: 7.3.1.3.*
(Continued)

*Primary Examiner* — Peter G Solinsky
*Assistant Examiner* — Sanjay K Dewan
(74) *Attorney, Agent, or Firm* — Ladas & Parry, LLP

(57) ABSTRACT

An information feedback method, a base station, a terminal and a storage medium are provided. The information feedback method includes: sending downlink control information to a terminal, where the downlink control information includes indication information configured to instruct the terminal to perform an information feedback, and the indication information includes at least one of a feedback delay of feeding back feedback information by the terminal, an indication of whether a LBT process is performed when
(Continued)

feeding back the feedback information by the terminal, a type of the LBT process performed when feeding back the feedback information by the terminal and a parameter configuration of the LBT process performed when feeding back the feedback information by the terminal; receiving the feedback information sent by the terminal based on the indication information in the downlink control information.

10 Claims, 4 Drawing Sheets

(51) Int. Cl.
   *H04W 72/04* (2009.01)
   *H04L 5/00* (2006.01)
   *H04W 72/12* (2009.01)
(58) Field of Classification Search
   USPC .......................................................... 370/329
   See application file for complete search history.

(56) References Cited

U.S. PATENT DOCUMENTS

| | | | |
|---|---|---|---|
| 2009/0034636 A1 | 2/2009 | Jayesh et al. | |
| 2012/0320857 A1 | 12/2012 | Young et al. | |
| 2016/0278078 A1* | 9/2016 | Cheng | H04W 74/0808 |
| 2016/0345206 A1* | 11/2016 | Yerramalli | H04J 11/00 |
| 2017/0156075 A1 | 6/2017 | Harada | |
| 2017/0222749 A1* | 8/2017 | Dinan | H04L 1/001 |
| 2017/0223675 A1* | 8/2017 | Dinan | H04W 72/042 |
| 2017/0280448 A1* | 9/2017 | Takeda | H04W 16/14 |
| 2018/0027554 A1* | 1/2018 | Yerramalli | H04W 68/005 370/329 |
| 2018/0352573 A1* | 12/2018 | Yang | H04W 76/27 |
| 2018/0352575 A1* | 12/2018 | You | H04W 74/0808 |
| 2019/0132103 A1* | 5/2019 | Yang | H04L 5/0037 |
| 2019/0393976 A1* | 12/2019 | Dinan | H04L 5/0091 |
| 2020/0177300 A1* | 6/2020 | Dinan | H04W 72/042 |

OTHER PUBLICATIONS

3GPP TSG RAN WG1 #83, Nov. 14-22, 2015, Anaheim, USA, Agenda Item: 6.2.3.1, Source: Qualcomm Incorporated, Title: Remaining details of UL LBT operation.*
Extended European Search Report from EP app. No. 17773015.7, dated Feb. 21, 2019.
Written Opinion of the International Searching Authority from PCT/CN2017/075922, dated Jun. 19, 2017, with English translation provided by WIPO.
International Preliminary Report on Patentability from PCT/CN2017/075922, dated Oct. 2, 2018, with English translation provided by WIPO.
"HARQ-ACK transmission on eLAA carrier", 3GPP TSG RAN WG1 Meeting #84, St. Julian's, Malta, Feb. 15-19, 2016.
"Remaining details of UL LBT operation", 3GPP TSG RAN WG1 #83, Anaheim, USA, Nov. 14-22, 2015.
International Search Report for PCT/CN2017/075922 dated Jun. 19, 2017 and its English translation provided by WIPO.
Written Opinion of the International Search Authority PCT/CN2017/075922 dated Jun. 19, 2017 and its English translation provided by Google Translate.

* cited by examiner

INFORMATION FEEDBACK METHOD, BASE STATION, TERMINAL AND STORAGE MEDIUM

CROSS-REFERENCE TO RELATED APPLICATIONS

The present application is the U.S. national phase of PCT Application PCT/CN2017/075922 filed on Mar. 8, 2017 which claims the priority to Chinese patent application No. 201610203320.6 filed on Apr. 1, 2016, the disclosures of which are incorporated herein by reference in their entireties.

TECHNICAL FIELD

The present disclosure relates to the field of communication technologies, and in particular, to an information feedback method, a base station, a terminal and a storage medium.

BACKGROUND

As new business requirements continue to emerge and become more demanding, a higher performance requirement is present for the future mobile communication systems, such as higher peak rates, better user experience smaller delay, higher reliability, higher spectral efficiency and higher energy efficiency, and need to support more user access and use various types of services. In order to support a large quantity of types of terminal connections and different types of services, the flexible configuration of uplink and downlink resources has become a major trend in the technology development. The system resources in the future can be divided into different sub-bands according to different services, and different transmission time intervals (TTIs) of different lengths are allocated on the sub-bands to meet various service requirements.

In order to support the deployment of the Long Term Evolution (LTE) system on the unlicensed spectrum resources to perform the transmission, an Licensed Assisted Access (LAA) process is defined, that is, the user needs to access a licensed primary carrier first before using the unlicensed carrier, and the unlicensed carrier may only act as a secondary carrier.

The unlicensed spectrum does not have a specific application system, and can be shared by various communication systems such as a Bluetooth system, a WiFi system, etc., and a plurality of systems shares the unlicensed spectrum resources by preempting resources. In order to ensure the transmission performance of LTE users and better use of unlicensed frequency bands, on the unlicensed spectrum, a Listen Before Talk (LBT) mechanism is required before the transmission. The LBT process is a clear channel assessment (CCA) performed by the device before using the channel for transmission, which determines whether there are other signals on the channel through an energy detection or the like to determine whether the channel is occupied or idle. The data transmission may be performed only when the channel is idle. In Europe and Japan, the LBT process must be used on the unlicensed bands. In addition, the carrier sensing using LBT is also a way of fair sharing on the unlicensed bands. Therefore, LBT is a necessary feature for a globally unified solution on unlicensed bands.

For the LAA uplink, it is not yet determined whether LBT is required to be performed or specific LBT types. On the one hand, for the terminal side, since the uplink transmission is performed by the base station scheduling, and the uplink scheduling signaling needs to be transmitted at least 4 subframes before the data transmission, therefore the base station may not judge whether the terminal side channel is occupied when scheduling the terminal. In some regions, it is also required that each station must perform LBT before the transmission, which also helps to eliminate some hidden nodes and improve coexistence performance. On the other hand, when the terminal only transmits the ACK/NACK (acknowledgment characters; non-acknowledgment characters) feedback information and takes up very short time period, similar to WiFi, the feedback information may be directly fed back without the LBT after a delay of 16 μs, and it is also possible to use such mechanism when sending feedback information in the LAA.

LTE frequency division duplex/time division duplex (FDD/TDD) ACK/NACK feedback timing sequence in the related art is described in the following.

In the LTE Rel-8 system, for the TDD system, each subframe has the uplink and downlink resources, so the ACK/NACK feedback information of the downlink subframe numbered with n is transmitted in the uplink subframe numbered with n+h. For the TDD system, the uplink and downlink transmissions share the frequency domain resources, the ACK/NACK feedback information of different downlink subframes may need to be transmitted in the same uplink subframe. As shown in Table 1, according to each h value in the set H; $\{h_0, h_1, A\ h_{G-1}\}$ corresponding to the uplink subframe numbered with n, it is able to determine the downlink subframe in which the ACK/NACK feedback needs to be performed in the uplink subframe (that is, the downlink subframe numbered with n−h, including the special subframe). The ACK/NACK feedback information of the G downlink subframes needs to be fed back by one uplink subframe, and G is the quantity of elements in the set H, of which the value is changed for different uplink subframes and different TDD uplink and downlink configurations.

TABLE 1

| U/D con. | H value set of TTD downlink Number of subframe | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

It should be noted that, the number in the above table is measured in radio frames. For the subframe numbered with n−k, if n−k is smaller than 0, it is indicated that the subframe is a subframe in the previous radio frame.

With the development of mobile technology, the future mobile communication systems need to provide lower network delays and support a wider variety of services, which has become a trend of technology development. In the future communication system, dynamic III length transmission may be supported. Since the flexible transmission structure is used, the feedback time point of the terminal may not be defined in advance. On the one hand, since the frame structure used on the unlicensed carrier is not a fixed frame structure, the time point of feeding back the ACK/NACK by the terminal may not be defined in advance; on the other hand, it is not certain whether the terminal performs the LBT or the LBT type when sending the feedback information. If the LAA supports the multiple LBT behaviors for the feedback information transmission, the terminal may not determine whether to use LBT and the type of LBT when transmitting the feedback information.

SUMMARY

The objective of the present disclosure is to provide an information feedback method, a base station and a terminal, so as to solve the technical issue in the related art that the terminal cannot accurately perform ACK/NACK feedback so the accuracy of communication cannot be guaranteed.

An information feedback method is provided in the present disclosure, including:

sending downlink control information to a terminal, where the downlink control information includes indication information configured to instruct the terminal to perform an information feedback, and the indication information includes at least one of a feedback delay of feeding back feedback information by the terminal, an indication of whether a LBT process is performed when feeding back the feedback information by the terminal, a type of the LBT process performed when feeding back the feedback information by the terminal and a parameter configuration of the LBT process performed when feeding back the feedback information by the terminal;

receiving the feedback information sent by the terminal based on the indication information in the downlink control information.

Optionally, the downlink control information carries a first preset quantity of bits in the case that the indication information includes the feedback delay of feeding back the feedback information by the terminal, where the first preset quantity of bits is configured to indicate the feedback delay of feeding back the feedback information.

Optionally, the first preset quantity of bits is configured to indicate a length of the feedback delay of feeding back the feedback information;

the first preset quantity is acquired by using a formula $x=\lceil \log_2 M \rceil$, where x is the first preset quantity, M is a quantity of time units in a maximum feedback delay length, $\lceil \ \rceil$ is a ceiling function, and a time unit of the length of the feedback delay is one of a subframe, a transmission time interval and an orthogonal frequency division multiplexing symbol bit.

Optionally, the first preset quantity of bits is configured to indicate an identifier of the length of the feedback delay of feeding back the feedback information in a preset delay set;

the first preset quantity is acquired by using a formula $x=\lceil \log_2 K \rceil$, where x is the first preset quantity, K is a quantity of parameters in the preset delay set, and $\lceil \ \rceil$ is a ceiling function.

Optionally, prior to the sending the downlink control information to the terminal, the information feedback method further includes: sending a radio resource control signaling carrying the delay set to the terminal.

Optionally, the length of the feedback delay is a quantity of time units between a downlink transmission time point and a feedback time point of feeding back the feedback information by the terminal which is preset by a base station; or the length of the feedback delay is a quantity of time units between an earliest feedback time point and a feedback time point of feeding back the feedback information by the terminal which is preset by a base station;

the downlink transmission time point is a transmission time point of the downlink control information or a transmission time point of a downlink data corresponding to the feedback information, and the earliest feedback time point is a time portion of feeding back the feedback information by the terminal at the earliest.

Optionally, the downlink control information carries a second preset quantity of bits in the case that the indication information includes the indication of whether the LBT process is performed when feeding back the feedback information by the terminal, where the second preset quantity of bits is configured to indicate whether the LBT process is performed when feeding back the feedback information by the terminal.

Optionally, the downlink control information carries a third preset quantity of bits in the case that the indication information includes the type and/or the parameter configuration of the LBT process performed when feeding back the feedback information by the terminal, where the third preset quantity of bits is configured to indicate the type and/or the parameter configuration of the LBT process performed when feeding back the feedback information by the terminal.

A base station is further provided in the present disclosure, including:

a first sending module, configured to send downlink control information to a terminal, where the downlink control information includes indication information configured to instruct the terminal to perform an information feedback, and the indication information includes at least one of a feedback delay of feeding back feedback information by the terminal, an indication of whether a LBT process is performed when feeding back the feedback information by the terminal, a type of the LBT process performed when feeding back the feedback information by the terminal and a parameter configuration of the LBT process performed when feeding back the feedback information by the terminal;

a first receiving module, configured to receive the feedback information sent by the terminal based on the indication information in the downlink control information.

Optionally, the downlink control information sent by the first sending module carries a first preset quantity of bits in the case that the indication information includes the feedback delay of feeding back the feedback information by the terminal, where the first preset quantity of bits is configured to indicate the feedback delay of feeding back the feedback information.

Optionally, the first preset quantity of bits is configured to indicate a length of the feedback delay of feeding back the feedback information;

the first preset quantity is acquired by using a formula $x=\lceil \log_2 M \rceil$, where x is the first preset quantity, M is a quantity of time units in a r maximum feedback delay length, $\lceil \ \rceil$ is a ceiling function, and a time unit of the length of the feedback delay is one of a subframe, a transmission time interval and an orthogonal frequency division multiplexing symbol bit.

Optionally, the first preset quantity of bits is configured to indicate an identifier of the length of the feedback delay of feeding back the feedback information in a preset delay set;

the first preset quantity is acquired by using a formula $x=\lceil \log_2 K \rceil$, where x is the first preset quantity, K is a quantity of parameters in the preset delay set, and $\lceil \ \rceil$ is a ceiling function.

Optionally, the first sending module is further configured to send a radio resource control signaling carrying the delay set to the terminal prior to sending the downlink control information.

Optionally, the length of the feedback delay is a quantity of time units between a downlink transmission time point and a feedback time point of feeding back the feedback information by the terminal which is preset by a base station; or the length of the feedback delay is a quantity of time units between an earliest feedback time point and a feedback time point of feeding back the feedback information by the terminal which is preset by a base station;

the downlink transmission time point is a transmission time point of the downlink control information or a transmission time point of a downlink data corresponding to the feedback information, and the earliest feedback time point is a time portion of feeding back the feedback information by the terminal at the earliest.

Optionally, the downlink control information sent by the first sending module carries a second preset quantity of bits in the case that the indication information includes the indication of whether the LBT process is performed when feeding back the feedback information by the terminal, where the second preset quantity of bits is configured to indicate whether the LBT process is performed when feeding back the feedback information by the terminal.

Optionally, the downlink control information sent by the first sending module carries a third preset quantity of bits in the case that the indication information includes the type and/or the parameter configuration of the LBT process performed when feeding back the feedback information by the terminal, where the third preset quantity of bits is configured to indicate the type and/or the parameter configuration of the LBT process performed when feeding back the feedback information by the terminal.

An information feedback method is further provided in the present disclosure, including:

receiving downlink control information sent by a base station, where the downlink control information includes indication information configured to instruct the terminal to perform an information feedback, and the indication information includes at least one of a feedback delay of feeding back feedback information by the terminal, an indication of whether a LBT process is performed when feeding back the feedback information by the terminal, a type of the LBT process performed when feeding back the feedback information by the terminal and a parameter configuration of the LBT process performed when feeding back the feedback information by the terminal;

sending the feedback information to the base station based on the indication information in the downlink control information.

Optionally, the downlink control information carries a first preset quantity of bits in the case that the indication information includes the feedback delay of feeding back the feedback information by the terminal, where the first preset quantity of bits is configured to indicate the feedback delay of feeding back the feedback information.

Optionally, the first preset quantity of bits is configured to indicate a length of the feedback delay of feeding back the feedback information;

the first preset quantity is acquired by using a formula $x=\lceil \log_2 m \rceil$, where x is the first preset quantity, M is a quantity of time units in a maximum feedback delay length, $\lceil \ \rceil$ is a ceiling function, and a time unit of the length of the feedback delay is one of a subframe, a transmission time interval and an orthogonal frequency division multiplexing symbol bit.

Optionally, the first preset quantity of bits is configured, to indicate an identifier of the length of the feedback delay of feeding back the feedback information in a preset delay set;

the first preset quantity is acquired by using a formula $x=\lceil \log_2 K \rceil$, where x is the first preset quantity, K is a quantity of parameters in the preset delay set, and $\lceil \ \rceil$ is a ceiling function.

Optionally, prior to the receiving the downlink control information sent by the base station, the information feedback method further includes: receiving a radio resource control signaling carrying the delay set sent by the base station.

Optionally, the length of the feedback delay is a quantity of time units between a downlink transmission time point and a feedback time point of feeding back the feedback information by the terminal which is preset by a base station; or the length of the feedback delay is a quantity of time units between an earliest feedback time point and a feedback time point of feeding back the feedback information by the terminal which is preset by a base station;

the downlink transmission time point is a transmission time point of the downlink control information or a transmission time point of a downlink data corresponding to the feedback information, and the earliest feedback time point is a time portion of feeding back the feedback information by the terminal at the earliest.

Optionally, the downlink control information carries a second preset quantity of bits in the case that the indication information includes the indication of whether the LBT process is performed when feeding back the feedback information by the terminal, where the second preset quantity of bits is configured to indicate whether the LBT process is performed when feeding back the feedback information by the terminal.

Optionally, the downlink control information carries a third preset quantity of bits in the case that the indication information includes the type and/or the parameter configuration of the LBT process performed when feeding back the feedback information by the terminal, where the third preset quantity of bits is configured to indicate the type and/or the parameter configuration of the LBT process performed when feeding back the feedback information by the terminal.

A terminal is further provided in the present disclosure, including:

a second receiving module, configured to receive downlink control information sent by a base station, where the downlink control information includes indication information configured to instruct the terminal to perform an information feedback, and the indication information includes at least one of a feedback delay of feeding back feedback information by the terminal, an indication of whether a LBT process is performed when feeding back the feedback information by the terminal, a type of the LBT process performed when feeding back the feedback information by the terminal and a parameter configuration of the LBT process performed when feeding back the feedback information by the terminal;

a second sending module, configured to send the feedback information to the base station based on the indication information in the downlink control information.

Optionally, the downlink control information received by the second receiving module carries a first preset quantity of bits in the case that the indication information includes the feedback delay of feeding back the feedback information by the terminal, where the first preset quantity of bits is configured to indicate the feedback delay of feeding back the feedback information.

Optionally, the first preset quantity of bits is configured to indicate a length of the feedback delay of feeding back the feedback information;

the first preset quantity is acquired by using a formula $x=\lceil \log_2 M \rceil$, where x is the first preset quantity, M is a quantity of time units in a maximum feedback delay length, $\lceil \ \rceil$ is a ceiling function, and a time unit of the length of the feedback delay is one of a subframe, a transmission time interval and an orthogonal frequency division multiplexing symbol bit.

Optionally, the first preset quantity of bits is configured to indicate an identifier of the length of the feedback delay of feeding back the feedback information in a preset delay set;

the first preset quantity is acquired by using a formula $x=\lceil \log_2 K \rceil$, where x is the first preset quantity, K is a quantity of parameters in the preset delay set, and $\lceil \ \rceil$ is a ceiling function.

Optionally, the second receiving module is further configured to receive a radio resource control signaling carrying the delay set sent by the base station prior to receiving the downlink control information.

Optionally, the length of the feedback delay is a quantity of time units between a downlink transmission time point and a feedback time point of feeding back the feedback information by the terminal which is preset by a base station; or the length of the feedback delay is a quantity of time units between an earliest feedback time point and a feedback time point of feeding back the feedback information by the terminal which is preset by a base station;

the downlink transmission time point is a transmission time point of the downlink control information or a transmission time point of a downlink data corresponding to the feedback information, and the earliest feedback time point is a time portion of feeding back the feedback information by the terminal at the earliest.

Optionally, the downlink control information received by the second receiving module carries a second preset quantity of bits in the case that the indication information includes the indication of whether the LBT process is performed when feeding back the feedback information by the terminal, where the second preset quantity of bits is configured to indicate whether the LBT process is performed when feeding back the feedback information by the terminal.

Optionally, the downlink control information received by the second receiving module carries a third preset quantity of bits in the case that the indication information includes the type and/or the parameter configuration of the LBT process performed when feeding back the feedback information by the terminal, where the third preset quantity of bits is configured to indicate the type and/or the parameter configuration of the LBT process performed when feeding back the feedback information by the terminal.

According to the present disclosure, the terminal is instructed to feedback information based on an indication in the downlink control information sent by the base station to the terminal, and the terminal sends the feedback information based on the indication, thereby guaranteeing that the base station may accurately receive the feedback information of the terminal and ensuring the reliability of the communication between the terminal and the base station.

DETAILED DESCRIPTION

In order to make the objects, the technical solutions and the advantages of the present disclosure more apparent, the present disclosure will be described hereinafter in details in conjunction with the drawings.

An information feedback method, a base station and a terminal are provided in the present disclosure, so as to solve the technical issue in the related art that the terminal cannot accurately perform ACK/NACK feedback so the accuracy of communication cannot be guaranteed.

Figure 1:
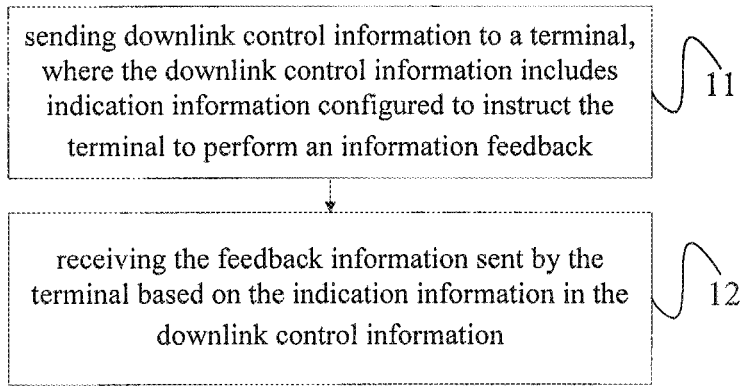
FIG. 1 is a schematic view of an information feedback method in some embodiments of the present disclosure.

As shown in FIG. 1, an information feedback method is provided in some embodiments of the present disclosure, which is applied to a base station side and includes:

Step 11: sending downlink control information to a terminal, where the downlink control information includes indication information configured to instruct the terminal to perform an information feedback.

To be specific, the indication information includes at least one of a feedback delay of feeding back feedback information by the terminal, an indication of whether a LBT process is performed when feeding back the feedback information by the terminal, a type of the LBT process performed when feeding back the feedback information by the terminal and a parameter configuration of the LBT process performed when feeding back the feedback information by the terminal.

It should be noted that, the base station may arbitrarily combine the content included in the indication information in an actual application.

Step 12: receiving the feedback information sent by the terminal based on the indication information in the downlink control information.

The feedback information in the embodiments mainly refers to the ACK/NACK information transmitted by the terminal based on the data received from the base station during the data communication.

The base station appoints the tune point when the terminal feeds back the ACK/NACK information and/or other manners and notifies the terminal through the downlink control information, so that the terminal may feedback the ACK/ NACK information in the appointed manner, thereby ensuring that the base station may accurately receive the ACK/

NACK information sent by the base station and ensuring the reliability of the communication between the terminal and the base station.

Optionally, the downlink control information carries a first preset quantity of bits in the case that the indication information includes the feedback delay of feeding back the feedback information by the terminal, where the first preset quantity of bits is configured to indicate the feedback delay of feeding back the feedback information.

To be specific, the first preset quantity of bits may be directly configured to indicate the length of the feedback delay of feeding back the feedback information, or be configured to indicate an identifier of the length of the feedback delay of feeding back the feedback information in a preset delay set.

1. When the first preset quantity of bits is configured to indicate a length of the feedback delay of feeding back the feedback information, the first preset quantity is acquired by using a formula $x=\lceil \log_2 M \rceil$, where x is the first preset quantity, M is a quantity of time units in a maximum feedback delay length, $\lceil \ \rceil$ is a ceiling function, and a time unit of the length of the feedback delay is one of a subframe, a transmission time interval and an orthogonal frequency division multiplexing symbol bit.

In this case, based on the received indication information, the terminal may acquire the length of the feedback delay by directly reading the data in the bits in the indication information. For example, the length of the feedback delay optional for the terminal is 1 subframe and 2 subframes, at this time, the base station may use 1 bit to indicate the length of the feedback delay. When the bit is 0, it is indicated that the length of the feedback delay of the terminal is 1 subframe. When the bit is 1, it is indicated that the length of the feedback delay of the terminal is 2 subframes.

2. When the first preset quantity of bits is configured to indicate an identifier of the length of the feedback delay of feeding back the feedback information in a preset delay set, where the first preset quantity is acquired by using a formula $x=\lceil \log_2 K \rceil$, where x is the first preset quantity, and K is a quantity of parameters in the preset delay set.

In this case, after receiving the indication information, the terminal reads the corresponding bit information, and then finds the corresponding length of the feedback delay in the delay set based on the bit information. For example, the delay set is {1 OFDM (Orthogonal frequency-division multiplexing) symbol bit, 2 OFDM symbol bits, 4 OFDM symbol bits, 6 OFDM symbol bits}, and 0, 1, 2, and 3 are respectively used as the identifiers of the lengths of the feedback delay in the delay set. When receiving the indication information, the bases station reads the bit 01 in the indication information. At this time, it is indicated that the length of the feedback delay used by the terminal is 2 OFDM symbol bits. If the bit is 11, it is indicated that the length of the feedback delay used by the terminal is 6 OFDM symbols.

It should be noted that, the above delay set may be predefined, that is, known by both the base station and the terminal; or may be configured by using a signaling. Optionally, prior Step 11, the base station sends a radio resource control signaling carrying the delay set to the terminal.

It should be noted that, when the delay set needs to be adjusted according to the network condition, the delay set may be semi-statically configured through the RRC signaling.

It should be noted that, the length of the feedback delay is a quantity of time units between a downlink transmission time point and a feedback time point of feeding back the feedback information by the terminal which is preset by a base station; or the length of the feedback delay is a quantity of time units between an earliest feedback time point and a feedback time point of feeding back the feedback information by the terminal which is preset by a base station;

the downlink transmission time point is a transmission time point of the downlink control information or a transmission time point of a downlink data corresponding to the feedback information, and the earliest feedback time point is a time portion of feeding back the feedback information by the terminal at the earliest. For example, the earliest feedback time point of the subframe n is n+4.

Optionally, the downlink control information carries a second preset quantity of bits in the case that the indication information includes the indication of whether the LBT process is performed when feeding back the feedback information by the terminal, where the second preset quantity of bits is configured to indicate whether the LBT process is performed when feeding back the feedback information by the terminal.

Assuming that the base station appoints that terminal uses only one LBT mechanism, it is able to identify whether to perform LBT by only one bit. For example, a bit of 0 indicates that LBT is not performed, and a bit of 1 indicates that LBT is performed.

Optionally, the downlink control information carries a third preset quantity of bits in the case that the indication information includes the type and/or the parameter configuration of the LBT process performed when feeding back the feedback information by the terminal, where the third preset quantity of bits is configured to indicate the type and/or the parameter configuration of the LBT process performed when feeding back the feedback information by the terminal.

It should be noted that, in this case, assuming that the base station appoints that the terminal needs to perform the LBT mechanism and four types of LBT are defined, the base station may use 2 bits to indicate the LBT type when sending the indication information. When each LBT type has multiple parameter configurations, the parameter configurations may be indicated through the appointed bits.

The above is the case where the LBT type and the parameter configuration are separately indicated. It is also able to use the joint coding method to indicate whether the LBT is performed and the type and/or configuration of the LBT. For example, A bits are used to indicate, and A bits can indicate 2A states, where one state indicates that the terminal does not need to perform LBT, and other states indicate the type and/or parameter configuration of LBT performed by the terminal.

The specific applications of the present disclosure in practical applications will be described hereinafter by examples.

Figure 2:
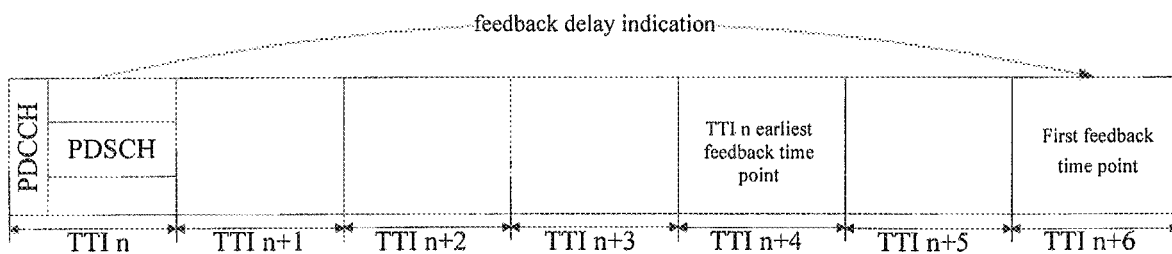
FIG. 2 is a schematic view of a feedback delay indication manner in some embodiments of the present disclosure.

Case 1:

On the licensed carriers, assuming that the base station indicates the feedback delay of the ACK/NACK feedback by the terminal through 3 bits in the downlink control information, the length of the feedback delay is a quantity of TTI between an earliest feedback time point and a first feedback time point (i.e., a feedback time point of feeding back the feedback information by the terminal which is preset by the base station). As shown in FIG. 2, the base station schedules the downlink data transmission in TTI n and indicates a feedback delay by bit 010 in the corresponding downlink control information. In view of the receiving processing time of the terminal, the earliest feedback time point is TTI n+4, then the terminal may determine, based on the bit 010 in the downlink control information, that there are 2 TTIs between the actual earliest feedback time point and the first feedback time point, and the terminal may feedback the ACK/NACK at TTI n+6.

Figure 3:
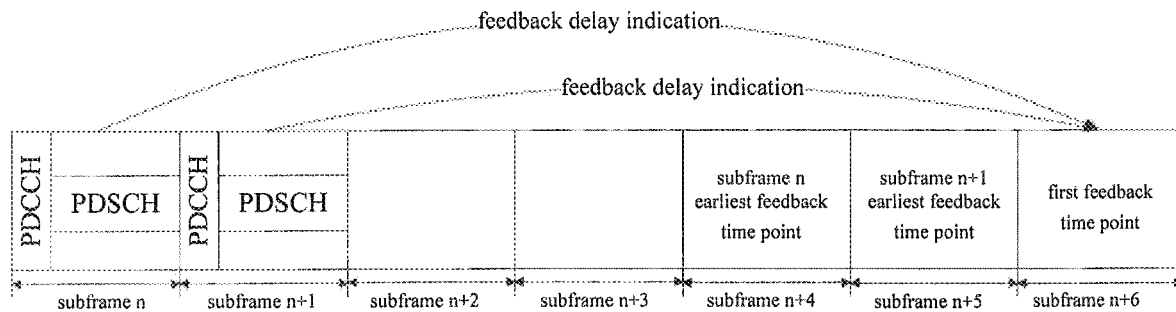
FIG. 3 is a schematic view of another feedback delay indication manner in some embodiments of the present disclosure.

Case 2:

On the unlicensed carriers, the base station indicates the delay of the ACK/NACK feedback by the terminal in the downlink control information by 4 bits, and the length of the feedback delay is the quantity of subframes between the first feedback time point and the earliest feedback time point. As shown in FIG. 3, the base station schedules the downlink data transmission on the subframe n and the subframe n+1, and the feedback delay is indicated by bit 0010 in the downlink control information corresponding to the subframe n, and the feedback delay is indicated by bit 0001 in the downlink control information corresponding to the subframe n+1. In view of the receiving processing time of the terminal, the earliest feedback time point of the subframe n is the subframe n+4, and the earliest feedback time point of the subframe n+1 is the subframe n+5, and then the terminal determines, based on the downlink control information, that there are 2 subframes between the earliest feedback time point and the first feedback time point of the subframe n, and there is one subframe between the earliest feedback time point and the first feedback time point of the subframe n+1, the first feedback time points of the subframe n and the subframe n+1 are both the subframe n+6, and then the terminal may at the earliest feedback the ACK/NACK of the subframe n and the subframe n+1 in the subframe n+6. Further, if the terminal fails to perform LBT of the subframe n+6, the transmission of the ACK/NACK may be postponed.

Case 3:

Assuming that the terminal does not perform LBT or performs the Type 2 and Type 4 of LBTs when feeding back the ACK/NACK on the unlicensed carrier, the base station may indicate, through 2 bits in the downlink control information, whether the terminal performs LBT and the type of LBT. For example, the base station instructs, through the bit 00 in the subframe n, the terminal not to perform LBT when feeding back the ACK/NACK, or instructs, through the bit 01 in the subframe n, the terminal to perform the Type 2 of LBT when feeding back the ACK/NACK, or instructs, through the bit 10 in the subframe n, the terminal to perform the Type 4 of LBT when feeding back the ACK/NACK, where the bit 11 is in a reserved state and does not indicate any information.

If the LBT may not be performed or the terminal supports the Type 2 of LBT when the terminal feeds back ACK/NACK, the base station may instruct the terminal through only 1 bit in the downlink control information. For example, the base station may instruct the terminal through the bit 0 not to perform LBT when feeding back the ACK/NACK, or the base station may instruct the terminal through the bit 1 to perform the Type 2 of LBT. Alternatively, if the LBT may not be performed or terminal supports the Type 4 of LBT, the base station may instruct the terminal through the bit 0 not to perform the LBT, and the base station may instruct the terminal through the bit 1 to perform the Type 4 of LBT. Similarly, if the terminal supports the Type 2 and Type 4 of LBTs, the base station may instruct the terminal through the bit 0 to perform the Type 2 of LBT, and the base station may instruct the terminal through the bit 1 to perform the Type 4 of LBT.

Case 4:

Assuming that the terminal only supports the Type 4 of LBT and 4 LBT priority parameters when feeding back the ACK/NACK on the unlicensed carrier, as shown in Table 2:

TABLE 2

| | LBT priority type | | | | |
|---|---|---|---|---|---|
| LBT priority types | Contention Window Minimum value (CWmin) | Contention Window Maximum Value (CWmax) | n | Maximum Channel Occupation Time (MCOT) | Set of CW sizes |
| 1 | 3 | 7 | 1 | 2 ms | {3, 7} |
| 2 | 7 | 15 | 1 | 3 ms | {7, 15} |
| 3 | 15 | 63 | 3 | 10 or 8 ms | {15, 31, 63} |
| 4 | 15 | 1023 | 7 | 10 or 8 ms | {15, 31, 63, 127, 255, 511, 1023} |

The base station indicates, through 2 bit in the downlink control signaling, the LBT priority type used by the terminal to transmit the feedback information when the terminal feeds back the ACK/NACKs. For example, the base station indicates through the bit 00 that the terminal uses the LBT priority type 1 when feeding back the ACK/NACK, or the base station indicates through the bit 01 that the terminal uses the LBT priority type 2 when feeding back the ACK/NACK, or the base station indicates through the bit 10 that the terminal uses the LBT priority type 3 when feeding back the ACK/NACK, or the base station indicates through the bit 11 that the terminal uses the LBT priority type 4 when feeding back the ACK/NACK.

It should be noted that, in the above specific application, the LBT type of the terminal indicated by the base station in a feedback window should be the same.

It should be noted that, the foregoing example only provides an implementation method in which only one type of indication information is included in the downlink control information. In fact, the downlink control information may include multiple types of control information at the same time, for example, in combination with the foregoing case 2 and case 3, the base station may configure 4-bit information to indicate the ACK/NACK feedback delay in the downlink control information of the subframe n, and further configures 2-bit information to indicate whether the LBT is performed and the specific LBT type performed when the terminal feeds back the ACK/NACK. In the meantime, the specific bit indication manner given by the above example is only one of the possibilities. Other embodiments based on the principle of the present disclosure with the specific indication bit manner different from the embodiments also fall into the scope of the present disclosure.

Figure 4:
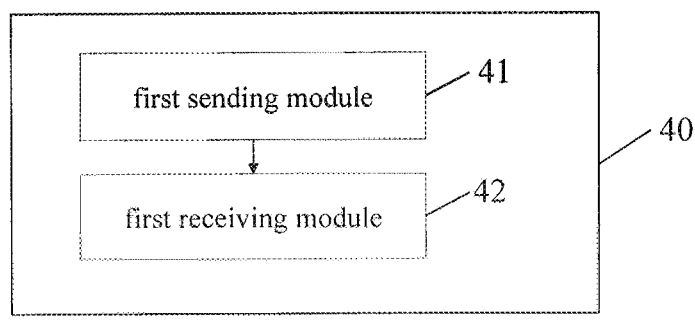
FIG. 4 is a block diagram showing a base station of in some embodiments of the present disclosure.

As shown in FIG. 4, a base station is provided in some embodiments of the present disclosure, including:

a first sending module 41, configured to send downlink control information to a terminal, where the downlink control information includes indication information configured to instruct the terminal to perform an information feedback, and the indication information includes at least one of a feedback delay of feeding back feedback information by the terminal, an indication of whether a LBT process is performed when feeding back the feedback information by the terminal, a type of the LBT process performed when feeding back the feedback information by the terminal and a parameter configuration of the LBT process performed when feeding back the feedback information by the terminal;

a first receiving module 42, configured to receive the feedback information sent by the terminal based on the indication information in the downlink control information.

Optionally, the downlink control information sent by the first sending module 41 carries a first preset quantity of bits in the case that the indication information includes the feedback delay of feeding back the feedback information by the terminal, where the first preset quantity of bits is configured to indicate the feedback delay of feeding back the feedback information.

To be specific, when the first preset quantity of bits is configured to indicate a length of the feedback delay of feeding back the feedback information, the first preset quantity is acquired by using a formula $x=\lceil \log_2 M \rceil$, where x is the first preset quantity, M is a quantity of time units in a maximum feedback delay length, $\lceil \: \rceil$ is a ceiling function, and a time unit of the length of the feedback delay is one of a subframe, a transmission time interval and an orthogonal frequency division multiplexing symbol bit.

To be specific, when the first preset quantity of bits is configured to indicate an identifier of the length of the feedback delay of feeding back the feedback information in a preset delay set, the first preset quantity is acquired by using a formula $x=\lceil \log_2 K \rceil$, where x is the first preset quantity, and K is a quantity of parameters in the preset delay set.

Optionally, the first sending module 41 is further configured to send a radio resource control signaling carrying the delay set to the terminal prior to sending the downlink control information.

To be specific, the length of the feedback delay is a quantity of time units between a downlink transmission time point and a feedback time point of feeding back the feedback information by the terminal which is preset by a base station; or the length of the feedback delay is a quantity of time units between an earliest feedback time point and a feedback time point of feeding back the feedback information by the terminal which is preset by a base station.

The downlink transmission time point is a transmission time point of the downlink control information or a transmission time point of a downlink data corresponding to the feedback information, and the earliest feedback time point is a time portion of feeding back the feedback information by the terminal at the earliest.

Optionally, the downlink control information sent by the first sending module 41 carries a second preset quantity of bits in the case that the indication information includes the indication of whether the LBT process is performed when feeding back the feedback information by the terminal, where the second preset quantity of bits is configured to indicate whether the LBT process is performed when feeding back the feedback information by the terminal.

Optionally, the downlink control information sent by the first sending module 41 carries a third preset quantity of bits in the case that the indication information includes the type and/or the parameter configuration of the LBT process performed when feeding back the feedback information by the terminal, where the third preset quantity of bits is configured to indicate the type and/or the parameter configuration of the LBT process performed when feeding back the feedback information by the terminal.

It should be noted that, the embodiment of the base station corresponds to the foregoing method embodiment. All the implementation manners in the foregoing method embodiments are applicable to the embodiment of the base station, and the same technical effects can be achieved.

Figure 5:
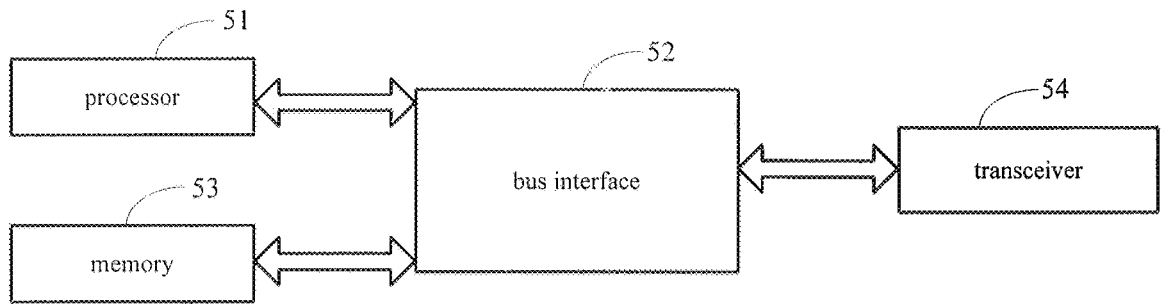
FIG. 5 is a schematic view of a base station in some embodiments of the present disclosure.

As shown in FIG. 5, a base station is further provided in some embodiments of the present disclosure, including:

a processor 51 and a memory 53 coupled to the processor 51 via a bus interface 52, where the memory is configured to store programs and data used by the processor 51 when performing operations, and the processor 51 calls and executes the programs and data stored in the memory 53 to:

send, through a transceiver 54, downlink control information to a terminal, where the downlink control information includes indication information configured to instruct the terminal to perform an information feedback, and the indication information includes at least one of a feedback delay of feeding back feedback information by the terminal, an indication of whether a LBT process is performed when feeding back the feedback information by the terminal, a type of the LBT process performed when feeding back the feedback information by the terminal and a parameter configuration of the LBT process performed when feeding back the feedback information by the terminal;

receive, through a transceiver 54, the feedback information sent by the terminal based on the indication information in the downlink control information.

The transceiver 54 is coupled to the bus interface 52 to receive and transmit data under the control of the processor 51.

It should be noted that in FIG. 5, the bus architecture may include any number of interconnected buses and bridges. To be specific, one or more processors represented by processor 51 are coupled to various circuits of memory represented by memory 53. The bus architecture can also couple various other circuits together, such as peripherals, voltage regulators, and power management circuits, which are well known in the art and, therefore, the detailed description thereof is omitted herein. The bus interface provides an interface. The transceiver 54 may include a plurality of components, including a transmitter and a transceiver, to provide means for communicating with various other devices on a transmission medium. The processor 51 is responsible for managing the bus architecture and the usual processing, and the memory 53 may store data used by the processor 51 when performing operations.

Those skilled in the art can understand that all or part of the steps of the above embodiments may be implemented by hardware, or may be implemented by a computer program indicating related hardware, and the computer program includes instructions for performing some or all of the above steps. The computer program can be stored in a readable storage medium, which can be any form of storage medium.

Figure 6:
FIG. 6 is a flowchart of an information feedback method in some embodiments of the present disclosure.

As shown in FIG. 6, an information feedback method is further provided in some embodiments of the present disclosure, which is applied at the terminal side and includes:

Step 61: receiving downlink control information sent by a base station, where the downlink control information includes indication information configured to instruct the terminal to perform an information feedback, and the indication information includes at least one of a feedback delay of feeding back feedback information by the terminal, an indication of whether a LBT process is performed when feeding back the feedback information by the terminal, a type of the LBT process performed when feeding back the feedback information by the terminal and a parameter configuration of the LBT process performed when feeding back the feedback information by the terminal;

Step 62: sending the feedback information to the base station based on the indication information in the downlink control information.

Optionally, the downlink control information carries a first preset quantity of bits in the case that the indication information includes the feedback delay of feeding back the feedback information by the terminal, where the first preset quantity of bits is configured to indicate the feedback delay of feeding back the feedback information.

To be specific, the first preset quantity of bits is configured to indicate a length of the feedback delay of feeding back the feedback information, the first preset quantity is acquired by using a formula $x=\lceil \log_2 M \rceil$, where x is the first preset quantity, M is a quantity of time units in a maximum feedback delay length, $\lceil \ \rceil$ is a ceiling function, and a time unit of the length of the feedback delay is one of a subframe, a transmission time interval and an orthogonal frequency division multiplexing symbol bit.

To be specific, the first preset quantity of bits is configured to indicate an identifier of the length of the feedback delay of feeding back the feedback information in a preset delay set, the first preset quantity is acquired by using a formula $x=\lceil \log_2 K \rceil$, where x is the first preset quantity, and K is a quantity of parameters in the preset delay set.

Optionally, when the first preset quantity of bits is configured to indicate the identifier of the length of the feedback delay of feeding back the feedback information in the preset delay set, prior to the receiving the downlink control information sent by the base station, the information feedback method further includes: receiving a radio resource control signaling carrying the delay set sent by the base station.

To be specific, the length of the feedback delay is a quantity of time units between a downlink transmission time point and a feedback time point of feeding back the feedback information by the terminal which is preset by a base station; or the length of the feedback delay is a quantity of time units between an earliest feedback time point and a feedback time point of feeding back the feedback information by the terminal which is preset by a base station.

The downlink transmission time point is a transmission time point of the downlink control information or a transmission time point of a downlink data corresponding to the feedback information, and the earliest feedback time point is a time portion of feeding back the feedback information by the terminal at the earliest.

Optionally, the downlink control information carries a second preset quantity of bits in the case that the indication information includes the indication of whether the LBT process is performed when feeding back the feedback information by the terminal, where the second preset quantity of bits is configured to indicate whether the LBT process is performed when feeding back the feedback information by the terminal.

Optionally, the downlink control information carries a third preset quantity of bits in the case that the indication information includes the type and/or the parameter configuration of the LBT process performed when feeding back the feedback information by the terminal, where the third preset quantity of bits is configured to indicate the type and/or the parameter configuration of the LBT process performed when feeding back the feedback information by the terminal.

All of the descriptions of the terminal in the foregoing embodiments are applicable to the embodiment of the information feedback method applied to the terminal side, and the same technical effects can be achieved.

Figure 7:
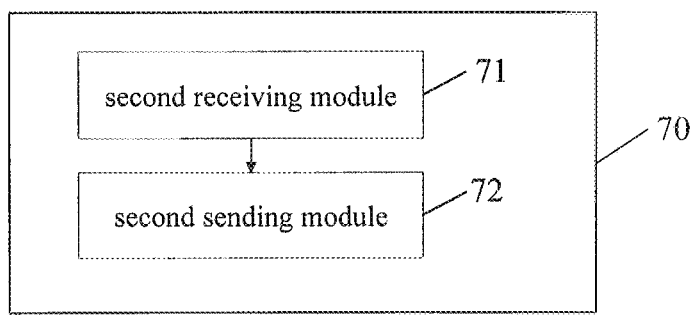
FIG. 7 is a block diagram showing a terminal of in some embodiments of the present disclosure.

As shown in FIG. 7, a terminal 70 is further provided in some embodiments of the present disclosure, including:

a second receiving module 71, configured to receive downlink control information sent by a base station, where the downlink control information includes indication information configured to instruct the terminal to perform an information feedback, and the indication information includes at least one of a feedback delay of feeding back feedback information by the terminal, an indication of whether a LBT process is performed when feeding back the feedback information by the terminal, a type of the LBT process performed when feeding back the feedback information by the terminal and a parameter configuration of the LBT process performed when feeding back the feedback information by the terminal;

a second sending module 72, configured to send the feedback information to the base station based on the indication information in the downlink control information.

Optionally, the downlink control information received by the second receiving module 71 carries a first preset quantity of bits in the case that the indication information includes the feedback delay of feeding back the feedback information by the terminal, where the first preset quantity of bits is configured to indicate the feedback delay of feeding back the feedback information.

To be specific, when the first preset quantity of bits is configured to indicate a length of the feedback delay of feeding back the feedback information, the first preset quantity is acquired by using a formula $x=\lceil \log_2 M \rceil$, where x is the first preset quantity, M is a quantity of time units in a maximum feedback delay length, $\lceil \ \rceil$ is a ceiling function, and a time unit of the length of the feedback delay is one of a subframe, a transmission time interval and an orthogonal frequency division multiplexing symbol bit.

To be specific, the first preset quantity of bits is configured to indicate an identifier of the length of the feedback delay of feeding back the feedback information in a preset delay set, the first preset quantity is acquired by using a formula $x=\lceil \log_2 K \rceil$, where x is the first preset quantity, and K is a quantity of parameters in the preset delay set.

Optionally, the second receiving module 71 is further configured to receive a radio resource control signaling carrying the delay set sent by the base station prior to receiving the downlink control information.

To be specific, the length of the feedback delay is a quantity of time units between a downlink transmission time point and a feedback time point of feeding back the feedback information by the terminal which is preset by a base station; or the length of the feedback delay is a quantity of time units between an earliest feedback time point and a feedback time point of feeding back the feedback information by the terminal which is preset by a base station.

The downlink transmission time point is a transmission time point of the downlink control information or a transmission time point of a downlink data corresponding to the feedback information, and the earliest feedback time point is a time portion of feeding back the feedback information by the terminal at the earliest.

Optionally, the downlink control information received by the second receiving module 71 carries a second preset quantity of bits in the case that the indication information includes the indication of whether the LBT process is performed when feeding back the feedback information by the terminal, where the second preset quantity of bits is configured to indicate whether the LBT process is performed when feeding back the feedback information by the terminal.

Optionally, the downlink control information received by the second receiving module 71 carries a third preset quantity of bits in the case that the indication information includes the type and/or the parameter configuration of the LIST process performed when feeding back the feedback information by the terminal, where the third preset quantity of bits is configured to indicate the type and/or the parameter configuration of the LBT process performed when feeding back the feedback information by the terminal.

It should be noted that, the embodiment of the terminal corresponds to the foregoing method embodiment. All the implementation manners in the foregoing method embodiments are applicable to the embodiment of the terminal, and the same technical effects can be achieved.

Figure 8:
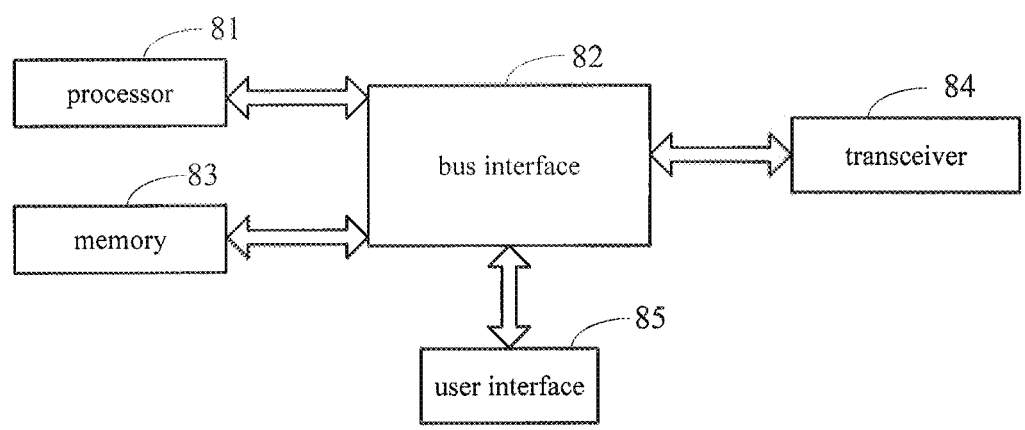
FIG. 8 is a schematic view of a terminal in some embodiments of the present disclosure.

As shown in FIG. 8, a terminal is further provided in some embodiments of the present disclosure, including:

a processor 81 and a memory 83 coupled to the processor 81 via a bus interface 82, where the memory is configured to store programs and data used by the processor 81 when performing operations, and the processor 81 calls and executes the programs and data stored in the memory 83 to:

receive, through a transceiver 84, downlink control information sent by a base station, where the downlink control information includes indication information configured to instruct the terminal to perform an information feedback, and the indication information includes at least one of a feedback delay of feeding back feedback information by the terminal, an indication of whether a Listen Before Talk (LBT) process is performed when feeding back the feedback information by the terminal, a type of the LBT process performed when feeding back the feedback information by the terminal and a parameter configuration of the LBT process performed when feeding back the feedback information by the terminal;

send, through a transceiver 84, the feedback information to the base station based on the indication information in the downlink control information.

The transceiver 84 is coupled to the bus interface 82 to receive and transmit data under the control of the processor 81.

It should be noted that in FIG. 8, the bus architecture may include any number of interconnected buses and bridges. One or more processors represented by processor 81 are coupled to various circuits of memory represented by memory 83. The bus architecture can also couple various other circuits together, such as peripherals, voltage regulators, and power management circuits, which are well known in the art and, therefore the detailed description thereof is omitted herein. The bus interface provides an interface. Transceiver 84 may include a plurality of components, including a transmitter and a transceiver, to provide means for communicating with various other devices on a transmission medium. For different terminals, the user interface 85 may also be an interface capable of externally coupling the required devices, including but not limited to a keypad, a display, a speaker, a microphone, a joystick, and the like. The processor 81 is responsible for managing the bus architecture and general processing, and the memory 83 may store the data used by the processor 81 when performing operations.

Those skilled in the art can understand that all or part of the steps of implementing the above embodiments may be achieved by hardware, or may be achieved by a computer program instructing related hardware, and the computer program includes instructions for performing some or all of the above steps. The computer program can be stored in a readable storage medium, which can be any form of storage medium.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. An information feedback method, comprising:

sending downlink control information to a terminal, wherein the downlink control information comprises indication information configured to instruct the terminal to perform an information feedback, and the indication information comprises a type of the LBT process performed when feeding back the feedback information by the terminal and a parameter configuration of the LBT process performed when feeding back the feedback information by the terminal;

receiving the feedback information sent by the terminal based on the indication information in the downlink control information;

wherein the downlink control information carries a first preset quantity of bits in the case that the indication information comprises the feedback delay of feeding back the feedback information by the terminal, wherein the first preset quantity of bits is configured to indicate the feedback delay of feeding back the feedback information;

wherein the first preset quantity of bits is configured to indicate an identifier of the length of the feedback delay of feeding back the feedback information in a preset delay set;

the first preset quantity is acquired by using a formula $x=\lceil \log_2 K \rceil$, wherein x is the first preset quantity, K is a quantity of parameters in the preset delay set, and $\lceil \ \rceil$ is a ceiling function.

2. The information feedback method according to claim 1, wherein prior to the sending the downlink control information to the terminal, the information feedback method further comprises: sending a radio resource control signaling carrying the delay set to the terminal.

3. The information feedback method according to claim 1, wherein the downlink control information carries a second preset quantity of bits in the case that the indication information comprises the indication of whether the LBT process is performed when feeding back the feedback information by the terminal, wherein the second preset quantity of bits is configured to indicate whether the LBT process is performed when feeding back the feedback information by the terminal.

4. The information feedback method according to claim 1, wherein the downlink control information carries a third preset quantity of bits in the case that the indication information comprises the type and/or the parameter configuration of the LBT process performed when feeding back the feedback information by the terminal, wherein the third preset quantity of bits is configured to indicate the type and/or the parameter configuration of the LBT process performed when feeding back the feedback information by the terminal.

5. A base station, comprising a processor and a memory storing a computer-readable instruction capable of being executed by the processor, wherein the processor is configured to execute the computer-readable instruction to:

send downlink control information to a terminal, wherein the downlink control information comprises indication information configured to instruct the terminal to perform an information feedback, and the indication information comprises a type of the LBT process performed when feeding back the feedback information by the terminal and a parameter configuration of the LBT process performed when feeding back the feedback information by the terminal;

to receive the feedback information sent by the terminal based on the indication information in the downlink control information;

wherein the downlink control information carries a first preset quantity of bits in the case that the indication information comprises the feedback delay of feeding back the feedback information by the terminal, wherein the first preset quantity of bits is configured to indicate the feedback delay of feeding back the feedback information;

wherein the first preset quantity of bits is configured to indicate an identifier of the length of the feedback delay of feeding back the feedback information in a preset delay set;

the first preset quantity is acquired by using a formula $x=\lceil \log_2 K \rceil$, wherein x is the first preset quantity, K is a quantity of parameters in the preset delay set, and $\lceil \ \rceil$ is a ceiling function.

6. An information feedback method, comprising:

receiving downlink control information sent by a base station, wherein the downlink control information comprises indication information configured to instruct the terminal to perform an information feedback, and the indication information comprises a type of the LBT process performed when feeding back the feedback information by the terminal and a parameter configuration of the LBT process performed when feeding back the feedback information by the terminal;

sending the feedback information to the base station based on the indication information in the downlink control information;

wherein the downlink control information carries a first preset quantity of bits in the case that the indication information comprises the feedback delay of feeding back the feedback information by the terminal, wherein the first preset quantity of bits is configured to indicate the feedback delay of feeding back the feedback information;

wherein the first preset quantity of bits is configured to indicate an identifier of the length of the feedback delay of feeding back the feedback information in a preset delay set;

the first preset quantity is acquired by using a formula $x=\lceil \log_2 K \rceil$, wherein x is the first preset quantity, K is a quantity of parameters in the preset delay set, and $\lceil \ \rceil$ is a ceiling function.

7. The information feedback method according to claim 6, wherein prior to the receiving the downlink control information sent by the base station, the information feedback method further comprises: receiving a radio resource control signaling carrying the delay set sent by the base station.

8. The information feedback method according to claim 6, wherein the downlink control information carries a second preset quantity of bits in the case that the indication information comprises the indication of whether the LBT process is performed when feeding back the feedback information by the terminal, wherein the second preset quantity of bits is configured to indicate whether the LBT process is performed when feeding back the feedback information by the terminal.

9. The information feedback method according to claim 6, wherein the downlink control information carries a third preset quantity of bits in the case that the indication information comprises the type and/or the parameter configuration of the LBT process performed when feeding back the feedback information by the terminal, wherein the third preset quantity of bits is configured to indicate the type and/or the parameter configuration of the LBT process performed when feeding back the feedback information by the terminal.

10. A terminal, comprising a processor and a memory storing a computer-readable instruction capable of being executed by the processor, wherein the processor is configured to execute the computer-readable instruction to:

receive downlink control information sent by a base station, wherein the downlink control information comprises indication information configured to instruct the terminal to perform an information feedback, and the indication information comprises a type of the LBT process performed when feeding back the feedback information by the terminal and a parameter configuration of the LBT process performed when feeding back the feedback information by the terminal;

send the feedback information to the base station based on the indication information in the downlink control information;

wherein the downlink control information carries a first preset quantity of bits in the case that the indication information comprises the feedback delay of feeding back the feedback information by the terminal, wherein the first preset quantity of bits is configured to indicate the feedback delay of feeding back the feedback information;

wherein the first preset quantity of bits is configured to indicate an identifier of the length of the feedback delay of feeding back the feedback information in a preset delay set;

the first preset quantity is acquired by using a formula $x=\lceil \log_2 K \rceil$, wherein x is the first preset quantity, K is a quantity of parameters in the preset delay set, and $\lceil \ \rceil$ is a ceiling function.

* * * * *